PRINTER

Filed June 18, 1959

2 Sheets-Sheet 1

April 25, 1961 F. N. SCHWEND 2,981,179

PRINTER

Filed June 18, 1959

2 Sheets-Sheet 2

2,981,179
Patented Apr. 25, 1961

2,981,179

PRINTER

Fred N. Schwend, El Monte, Calif., assignor to Clary Corporation, San Gabriel, Calif., a corporation of California Filed June 18, 1959, Ser. No. 821,261

3 Claims. (Cl. 101—96)

This invention relates to printing apparatus and has particular reference to listing machines for listing data and for concomitantly printing such data in coded form on an elongate strip or tape suitable for automatic sensing and translation.

In the past several years increasing use has been made of punched or printed tape for transmitting information to and from various data processing machines. Generally, the tape is produced by a punch or printer under control of a data processing machine upon operation of the latter under control of a keyboard on which amounts are manually entered. Thereafter, the tape may be used to transfer the originally entered data and/or the processed data to other equipment, thereby obviating the necessity of having to manually enter such data with the attendant possibility of errors as well as additional manual work.

In accordance with the present invention, data is recorded on a tape by imprinting thereon, with a suitable printing ribbon or the like, a code representing data entered into the listing machine. Such coded information is recorded at the same time information is listed by the machine. The ink ribbon may contain a standard ink whereby the resulting tape may be sensed by suitable photoelectric sensing equipment or the ink ribbon may contain an ink having magnetic characteristics whereby the resulting tape may be sensed by suitable magnetic spot sensing equipment.

Accordingly, a principal object of the present invention is to provide a simple and reliable listing machine for concurrently listing data and recording the same in coded form on an elongate tape.

Another object is to insure proper spacing of the listed record medium and the elongate coded tape relative to operation of the listing machine.

A further object is to provide a coded tape imprinting mechanism incorporated in a listing data processing machine in which no additional time is required to effect printing of the coded tape.

A further object is to provide a listing data processing machine having printing instrumentalities for simultaneously printing in coded form a block of data along an elongate tape.

A further object is to utilize a standard listing machine and keyboard therefor for producing coded tape so that an experienced operator of such listing machine may obtain such coded tape without additional training.

The manner in which the above and other objects of the invention are accomplished will be readily understood on reference to the following specification when read in conjunction with the accompanying drawings, wherein.

Figures 1, 5:
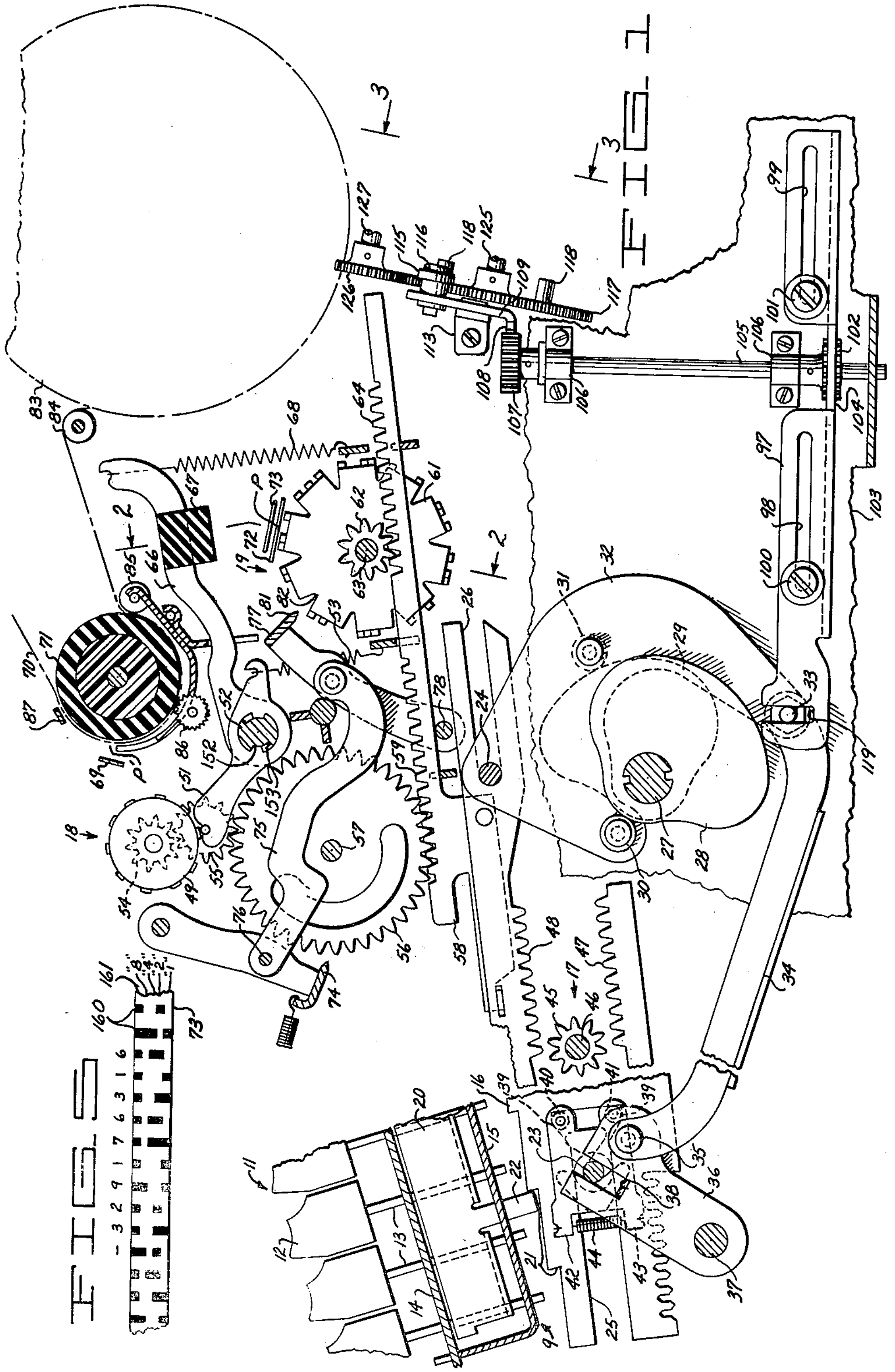
Fig. 1 is a longitudinal sectional view through a printing machine embodying a preferred form of the invention and illustrating the racks, rack drive, keyboard, accumulator, and printing mechanisms.
Fig. 5 illustrates a sample of code tape printed by the machine of the present invention.

The particular embodiment of the invention disclosed herein is applied to the well known and commercially available Clary adding machine which is disclosed and claimed in its basic form in the patent to R. E. Boyden, No. 2,583,810 issued on January 29, 1952. Therefore, in general, only those parts of the adding machine which intimately relate to and coact with the parts embodying the present invention will be disclosed herein, and reference may be had to the aforesaid patent for an understanding of the complete machine. However, it is to be understood that the invention is not limited to this basic machine and could be used with other types of adding machines, cash registers, calculating machines, or the like.

The machine comprises a keyboard, generally indicated in part at 9, which embodies a plurality of rows of amount keys 11, each row containing keys ranging in value from "1" to "9."

Amounts entered into the keyboard are transferred by respective drive racks 16 to an accumulator, generally indicated at 17, to a numerical printer mechanism, generally indicated at 18, and to a code printer mechanism, generally indicated at 19. The racks 16 are also effective during totaling and sub-totaling operations to transfer amounts registered in the accumulator 17 to the printer mechanisms 18 and 19.

The keyboard is of the flexible type in that each key, when depressed, is effective to release a previously depressed key in the same row. Each of the keys 12 contains a key stem 13, which is guided by aligned slots formed in a top plate 14 and a bottom plate 15 of the keyboard frame.

Spring means (not shown) are provided for normally retaining keys 12 in their illustrated raised positions.

Upon depression of a key 12, a cam lobe (not shown) carried by the key stem 13 thereof, will rock a locking bail 20, suitably mounted in the keyboard frame outwardly to effect release of any previously depressed key. As the depressed key reaches the bottom of its stroke, the cam lobe will pass below the bail 20, enabling the latter to partially retract to a position where it latches the key depressed. The lower end of the key stem 13 will now be located in the path of an associated shoulder 21 formed on the aligned rack.

A zero block lug 22 extends down from the bail 20 and is normally located, when no key of the associated row is depressed, directly in front of one of the shoulders 21, preventing appreciable advancement of rack 16. However when an amount key in the associated row is depressed, the locking bail 20, will carry the lug 22 out of blocking position relative to the rack.

The various racks 16 are guided for fore and aft movement by shafts 23 and 24 embraced by slots 25 and 26, respectively, in each rack.

The machine is driven by a suitable motor means through a cyclic clutch (not shown) mounted on a shaft 27.

Means are provided for yieldably transmitting a reciprocating motion to the various drive racks 16 from the shaft 27 during rotation of the latter. This motion is transmitted from a pair of juxtaposed complementary drive cams 28 and 29 keyed on the shaft 27. A pair of cam rollers 30 and 31 ride on the periphery of their respective cams and are mounted on a cam follower 32 which at its upper end is pivoted on the shaft 24. The lower end of the cam follower is pivoted by a pin 33 to a link 34, the latter being loosely pinned at 35 to an arm 36 attached to a rockable shaft 37. The arm 36 at its upper end has a slot 38 which embraces the one end of shaft 23. A similar arm (not shown) is provided to embrace the opposite end of the shaft 23.

The slot 25 in each of the racks terminates at its closed end in opposed notches 39, normally engaged by rollers 40 and 41 carried by drive pawls 42 and 43, respectively. Each pair of such pawls is rockably fitted within a groove on the shaft 23, and the pawls are spring urged in opposite directions about the shaft 23 by a tension spring 44, connected between the tails of the two pawls, thus forming a yieldable connection between drive shaft 23 and the respective rack 16.

When the drive shaft 23 is moved forwardly along suitable guide bearings (not shown) under the influence of arm 36, it carries the respective racks 16 forwardly until each rack is arrested by either the associated zero block 22 or a depressed key stem 13. At this point, the rollers will move out of their depressions against the action of the springs 44, and will ride along the edges of the slot 25.

The accumulator comprises a plurality of gears 45 rotatably mounted on a shaft 46 which, through means not shown, is moved upwardly to mesh the gears with rack teeth 48 for additive accumulation, and is moved downwardly to mesh the gears with rack teeth 47 for subtractive accumulation or for totaling. Suitable tens transfer mechanism (not shown) is provided to cooperate with the accumulator gears.

The numerical printer comprises a series of numeral printing wheels 49 equal in number to the number of drive racks 16. Each numeral printing wheel has thereon a series of type ranging from "0" to "9" and these wheels are so connected to the associated racks that they will print a digit corresponding to the value of the key depressed in the associated key bank or to the numerical position to which the rack is moved in its forward stroke.

Each wheel 49 is rotatably mounted on a separate lever 51 which is loosely keyed on a printer control shaft 52. That is, each lever has a pair of short tenons 152 which extend into relatively wider keyways 153 in the shaft, thereby forming a lost motion connection. The levers 51 are each spring urged clockwise by a tension spring 53 connected between the lever 51 and a portion of the machine frame. Each of the wheels 49 has secured thereto a gear 54 permanently meshed with a gear 55 also rotatably mounted on the lever 51. When the lever 51 is held in its normal position illustrated in Fig. 1 by the shaft 52, the gear 55 is meshed with an aligned one of a series of large idler gears 56 rotatably mounted on a cross shaft 57. The latter gears are in continuous mesh with the teeth 59 of an off-set rack 58 connected to an associated rack 16.

Figures 3, 4, 6:
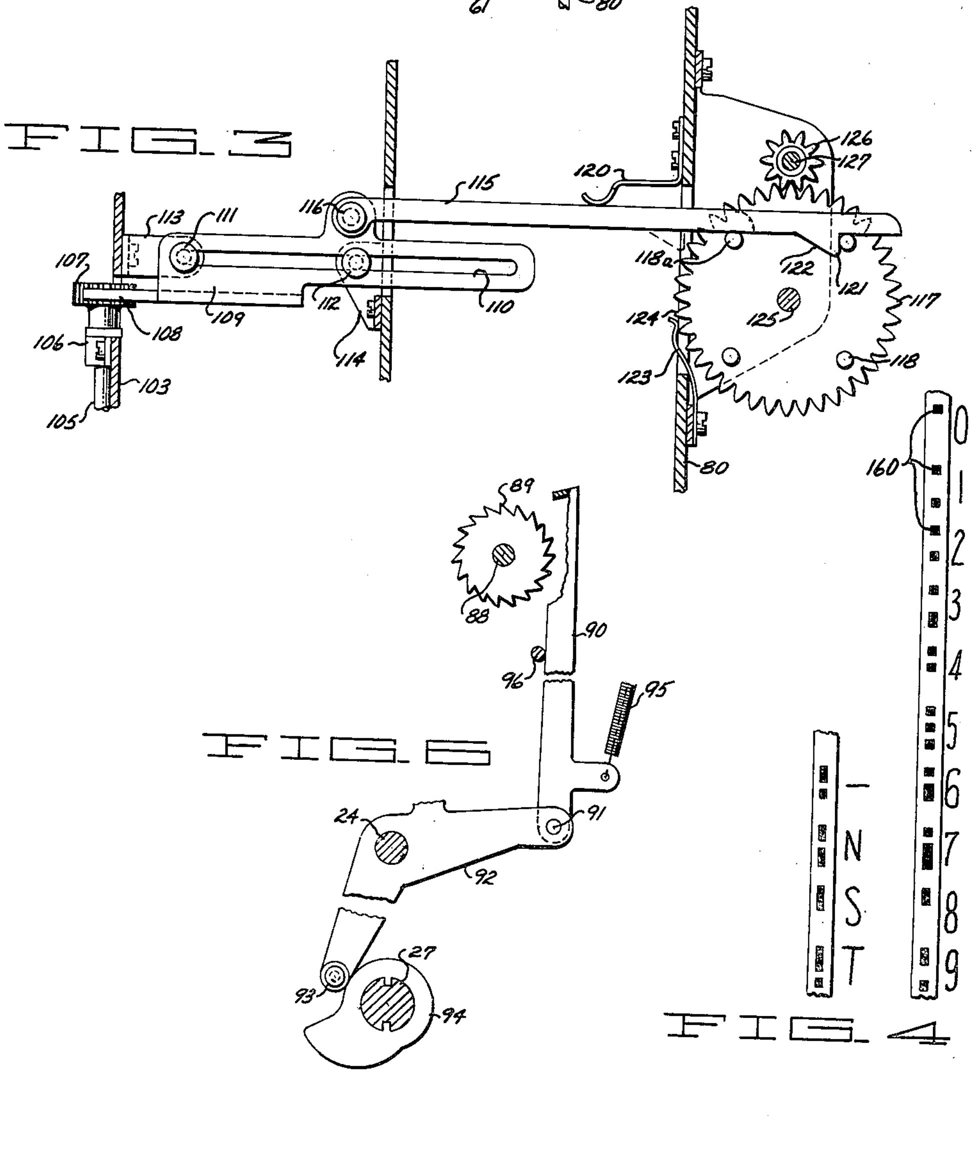
Fig. 3 is a sectional view illustrating the gears and linkage for advancing the code tape and is taken substantially along line 3—3 of Fig. 1.
Fig. 4 is a developed view illustrating coded representations of respective numbers and symbols, spaced around the periphery of the code print wheels.
Fig. 6 is a view illustrating the paper advance mechanism for the numerical printer.

The code printer comprises a series of code printing wheels 61 equal in number to the number of numerical printing wheels 49. Each code wheel has spaced around its periphery ten sets of dot printing elements, each set representing, in coded form, one of the respective digits from "0" to "9," as illustrated in Fig. 4.

Each of the code printing wheels is connected to its associated rack through a gear 62 made integral with the code wheel, which is rotatably mounted on a stationary cross shaft 63. The gear 62, being in constant mesh with the teeth 64 of the off-set rack 58, will rotate the code wheel 61, placing the code set representative of the rack displacement, at a printing station P.

The code printing is done in opposite relationship to the numerical printing, i.e., instead of spring urging the print wheels into contact with an associated platen 71 as is done in numerical printing, code printing is effected by individual arms 66 loosely keyed on the print control shaft 52. That is, each of the arms has a pair of short tenons similar to tenons 152 extending into the keyways 153 to form lost motion connections. Each of the arms 66 carries a platen 67, made of a suitable material such as rubber, and is spring urged clockwise under the influence of a tension spring 68, connected between arm 66 and a portion of the machine frame.

At approximately the mid-point in a machine cycle, and after the racks have digitized the accumulator, the numerical printer wheels 49 and the code printer wheels 61, the print control shaft 52 is rocked clockwise permitting the springs 53 to rock the printer arms 51 and thus carry the numerical printing wheels 49 forwardly into contact with a printing ribbon 69 and a record medium or paper strip 70, which is carried on the platen 71 whereby to print the number registered on the wheels onto the paper at the printing station P'. At the same time rocking of the control shaft 52 will permit the springs 68 to rock the arms 66 carrying the individual platens 67 downwardly into contact with a code printing ribbon 72 and an elongate record member or paper strip 73, bringing them into contact with print wheels 61 at print station P to effect a print on the strip 73.

At this point it should be noted that the rocking of the print control shaft does not in itself effect printing but merely releases the loosely keyed arms 51 and 66 to the influence of their respective tension springs. By this means, any close co-ordination which would otherwise be necessary between the shaft 52 and the two printing mechanisms, and between their individual printing elements, is eliminated.

In order to hold the various gears 56 in their respective positions during a print operation, when the gears 55 are demeshed therefrom, a locking bail 74 is provided. Before the gears 55 are demeshed and after the racks have reached their forwardly advanced positions, the bail is rocked counterclockwise, through means not shown, into detenting engagement with gears 56.

Figure 2:
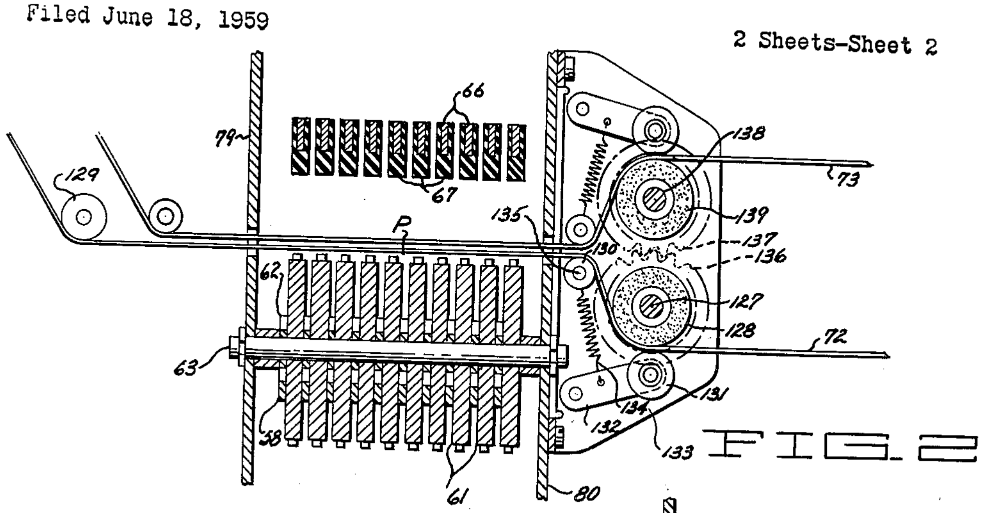
Fig. 2 is a sectional view illustrating the code printing wheels, respective platens and code tape advance mechanism, and is taken along the line 2—2 of Fig. 1.

A link 75 is loosely pinned at 76 to bail 74 at one end and at its opposite end it is pinned to a locking bail 77, the bail being pivotally mounted on a shaft 78 which is secured to printer side frames 79 and 80 (Fig. 2). The bail 77 will, through the link 75, be rocked clockwise, forcing the forward edge 81 of the bail generally aligned detents 82 on the code wheels 61. By this means, the printing edges of wheels 61 are held parallel to the striking edges of the platens 67, preventing misprinting.

The paper strip or record medium 70 is fed from a supply roll 83, over a guide roller 84, to pass between a pressure roller 85 and the platen 71. From there it passes between another pressure or feed roller 86 and the platen, thence past the print station P' and out under a tear off bar 87.

The advancement of the platen 71 and consequently of the paper 70 is accomplished by mounting a ratchet wheel 89 (Fig. 6) on a common shaft 88 along with the platen. The ratchet wheel is normally advanced one increment during each machine cycle by a pawl 90, pivoted on a pin 91 at the lower end thereof to a cam follower 92. The latter is pivoted on the aforementioned shaft 24 and carries a cam roller 93 held on the periphery of a cam 94, keyed to the shaft 27, by tension spring 95.

The spring 95, tensioned between a lower part of the pawl 90 and a suitable part (not shown) of the machine frame, normally maintains the pawl 90 in its upper position illustrated, and also holds the pawl in a counterclockwise rocked position wherein it rides against a guide pin 96 and wherein it will be in position to engage and advance the ratchet wheel 89 when driven downwardly by the cam 94. Means (not shown) are provided to reposition the guide pin 96 to permit the pawl 90 to engage and advance the ratchet wheel an abnormal number of increments during totalling and sub-totalling operations.

The means for guiding and advancing the record member 73 and ink ribbon 72 past the print point P is accomplished by a drive rack 97, slideably mounted on a machine side frame 103. A pair of slots 98 and 99 formed in rack 97 embrace a pair of respective pins 100 and 101 attached to machine side frame 103. The rack is provided with a slot 119 embracing the aforementioned pin 33 on the cam follower 32.

The rack 97 carries on its inwardly extending edge 104 a row of teeth (not shown) which are in continuous mesh with a gear 102. The gear 102 being pinned to the lower end of a rotatable shaft 105, the latter being journalled in bearings 106 secured to the machine side frame. The upper end of the shaft 105 carries a gear 107, which is in continuous mesh with teeth formed on a lower lip 108 of a rack (Figs. 1 and 3). The latter has a slot 110 embracing a pair of guide pins 111 and 112 carried on respective brackets 113 and 114 secured to machine frame members.

A drive pawl 115, loosely pinned at 116 to rack 109, will through engagement of four equi-spaced pins 118 drive a gear 117 fastened on a rotatable shaft 125, through a partial rotation.

Through the action of the cam follower 32 during the first half of a machine cycle, the rack 97 will be pulled forwardly, to drive the rack 109 to the left, the pawl 115 riding on the respective pin 118 under the influence of a leaf spring 120. The pawl 115 carries a projection 121 and upon movement to the left, a sloped edge 122 of projection 121 will ride over a succeeding pin 118*a* whereupon a shoulder at the right-hand end of the projection will drop behind pin 118*a*, as illustrated by dotted lines. During this movement, the gear 117, which carries the pins 118 will be held from movement by the action of a detent leaf spring 123 mounted on the printer side frame 89 and tensioned against the teeth 124 of the gear.

During the latter half of the machine cycle and after the print operation has been performed the action of the cam follower 32 will reverse, driving the rack 97 rearwardly (to the right in Fig. 1) to its home position; consequently, the pawl 115 will be advanced to the right in Fig. 3 to advance the gear 117 clockwise through approximately 90°.

A gear 126, mounted on a rotatable shaft 127 meshes with the gear 117. Upon rotation of the gear 126 and shaft 127 by the gear 117, a friction drive wheel 128 (Fig. 2) also mounted on the shaft 127 will be rotated counterclockwise. Under the influence of wheel 128 the ink ribbon 72 will be advanced from its supply (not shown) over a guide roller 129, past the point P on the code print wheels, over another guide roller 130 and onto the periphery of the friction wheel 128.

In order to maintain the ribbon in frictional contact with the friction drive wheel 128, a pressure roller 131 is rotatably mounted on an arm 132, loosely pinned to a back plate 133. The roller is urged toward the friction wheel under the action of a tension spring 134 connected between the arm 132 and a pin 135 which rotatably supports the guide roller 130.

The shaft 127 carries a gear 136 which meshes with a gear 137 mounted on a rotatable shaft 138 journalled in a bushing in the back plate 133. On the front side of the plate 133 and mounted on the shaft 138 is another friction drive wheel 139 which drives the paper strip 73 in the same manner as wheel 128 drives ribbon 72.

Driving of the gear 117 in the latter half of the machine cycle, aforementioned, will at the same time drive the friction wheels 128 and 139. Thus, toward the end of each machine cycle the portion of the strip 73 containing a block of printed information will be advanced from the printing mechanism and a new section of the strip as well as a new section of the ink ribbon will be presented between the platens and code wheels preparatory for the next machine cycle.

Fig. 4 illustrates the particular code representation for numerals and certain symbols applied to the code print wheels. However, it is obvious that many other forms of code representations may be used.

The code shown is of the binary decimal form, using four bit positions representing the weighted values "1," "2," "4," and "8." A fifth, uppermost bit mark 160 is located in each code set to form a timing or clock track 161 for tape reading or sensing purposes. Fig. 5 illustrates a section of a sample tape printed by the mechanism of the present invention.

Although I have described my invention in detail in its preferred form and therefore have utilized certain specific terms and languages herein, it is to be understood that changes and modifications may be made without departing from the spirit or scope of the claims appended hereto.

Having thus described my invention, what I desire to secure by United States Letters Patent is:

1. In a machine of the class described, the combination with a plurality of denominationally arranged differential actuators, means for advancing and retracting said actuators, means for differentially controlling the extent of movement of said actuators, a platen for supporting a record medium, a print control shaft, arms on said shaft, and type wheels carried by said arms and operatively connected to said actuators; of code printing wheels having code printing characters thereon, means operatively connecting said code printing wheels to said actuators, means for guiding an elongate record member endwise past said code printing wheels, platen means carried by said shaft, and means operable after advancement and before retraction of said actuators for rocking said shaft whereby to cause said type wheels to transfer an impression thereof to said record medium and to cause said platen means to transfer an impression from said code printing wheels to said record member.

2. In a machine of the class described, the combination with a plurality of denominationally arranged differential actuators, means for advancing and retracting said actuators, means for differentially controlling the extent of advancement of said actuators, a platen for supporting a record medium, a printer control shaft, arms on said shaft, and type wheels carried by said arms and operatively connected to said actuators; of code printing wheels having code printing characters thereon, means operatively connecting said code printing wheels to said actuators, means for guiding an elongate record member endwise past said code printing wheels a plurality of platens for respective ones of said code printing wheels, arms supporting said last mentioned platens, means forming lost motion connections between said shaft and said last mentioned arms, and means operable after advancement and before retraction of said actuators for rocking said shaft whereby to enable said type wheels to transfer an imprint thereof to said record medium and to enable said platens to transfer an imprint from said code printing wheels to said record member.

3. In a machine of the class described, the combination with a plurality of denominationally arranged differential actuators, means for advancing and retracting said actuators, means for differentially controlling the extent of advancement of said actuators, a platen for supporting a record medium, a printer control shaft, arms on said shaft, and type wheels carried by said arms and operatively connected to said actuators; of a plurality of coaxially arranged code printing wheels having code printing characters thereon, means operatively connecting said code printing wheels to said actuators, means for guiding an elongate record member endwise in a direction parallel to the axes of said wheels, a plurality of platens for respective ones of said code printing wheels, arms supporting said last mentioned platens, means forming lost motion connections between said shaft and said last mentioned arms, spring means urging said platens toward said code printing wheels, and means operable after advancement and before retraction of said actuators for rocking said shaft whereby to enable said type wheels to transfer an imprint thereof to said record medium and to enable said spring means to actuate said platens to transfer an imprint from said code printing wheels to said record member.

References Cited in the file of this patent

UNITED STATES PATENTS

| | | |
|---|---|---|
| 1,675,969 | Bull | July 3, 1928 |
| 2,281,851 | Mehan | May 5, 1942 |
| 2,418,027 | Gubelman | Mar. 25, 1947 |
| 2,506,337 | Boyden | May 2, 1950 |
| 2,554,707 | Johnson | May 29, 1951 |
| 2,567,134 | Stuivenberg | Sept. 4, 1951 |
| 2,582,187 | Wolowitz | Jan. 8, 1952 |
| 2,678,601 | Auebbach | May 18, 1954 |
| 2,708,873 | Braun | May 24, 1955 |
| 2,858,889 | Kent | Nov. 4, 1958 |
| 2,874,632 | Collins | Feb. 24, 1959 |
| 2,910,934 | Bihaly | Nov. 3, 1959 |